June 25, 1968     A. V. MANDEKIC     3,389,762
POWER-OPERATED MECHANICAL STEERING APPARATUS
FOR TRAILERS AND SEMI-TRAILERS
Filed Aug. 19, 1966     6 Sheets-Sheet 6

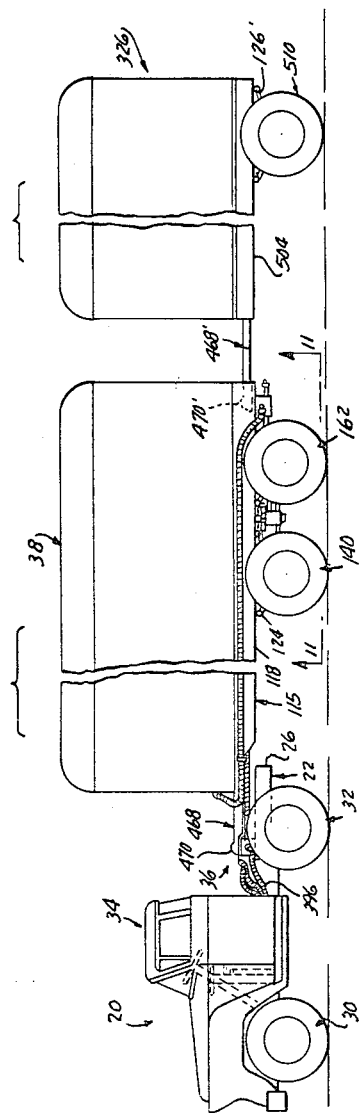

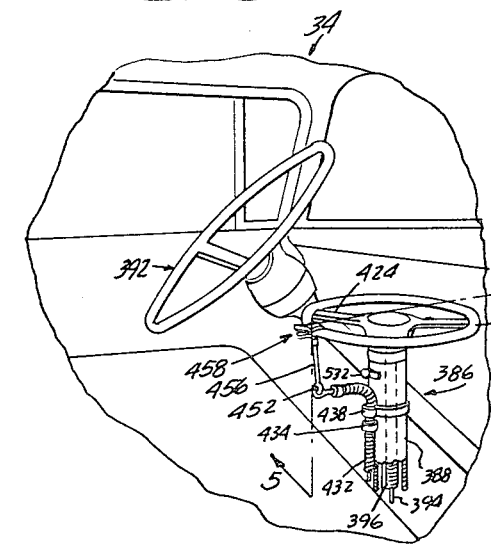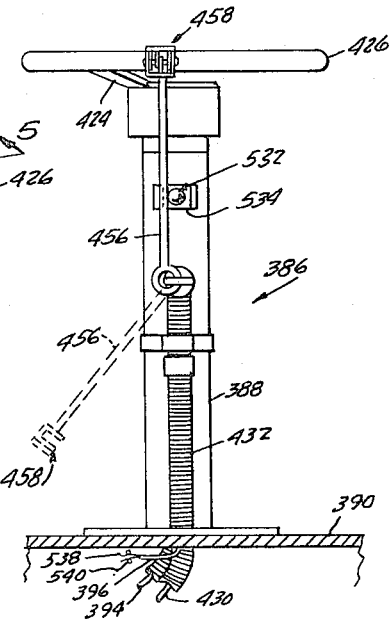

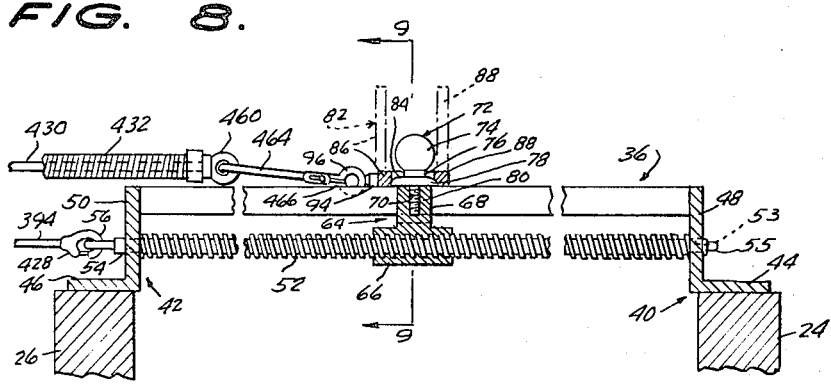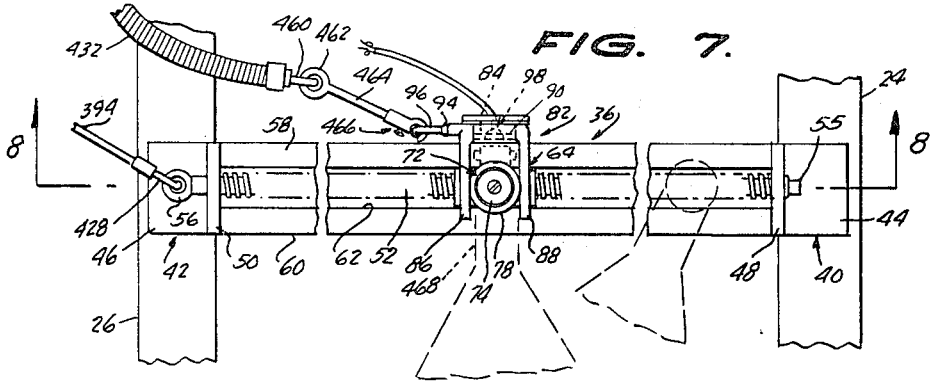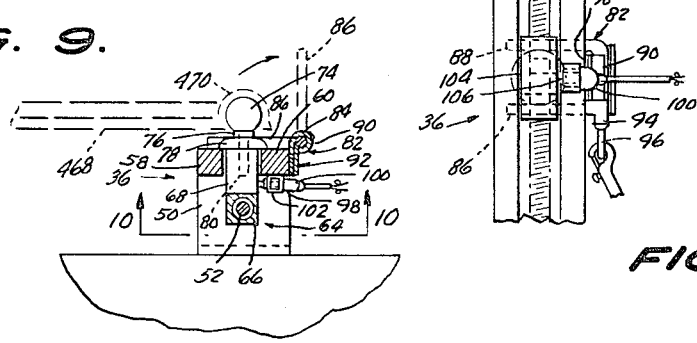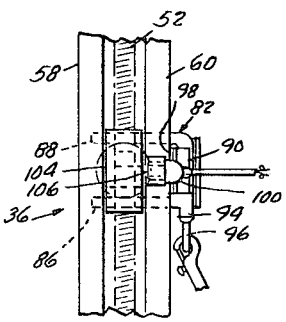

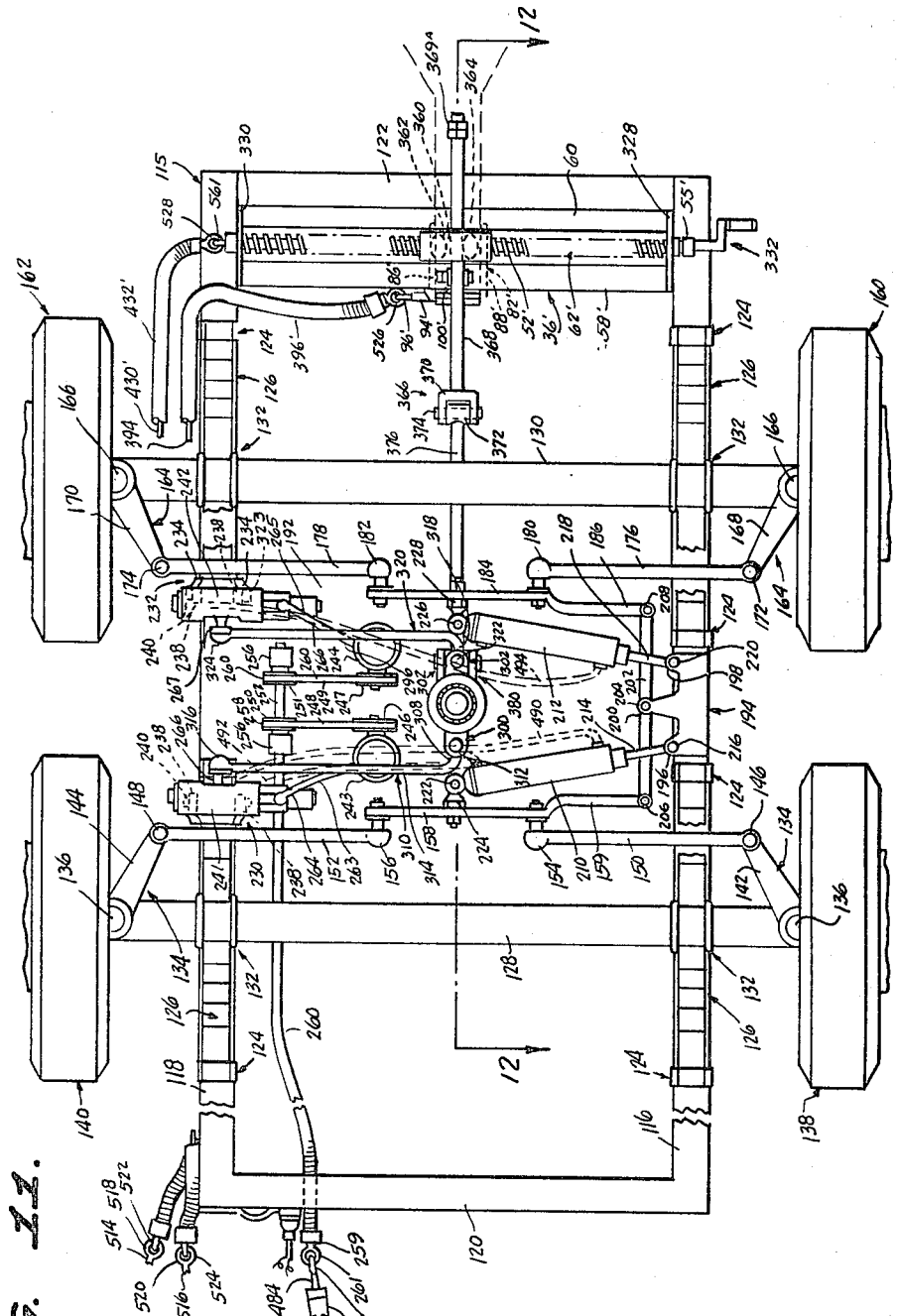

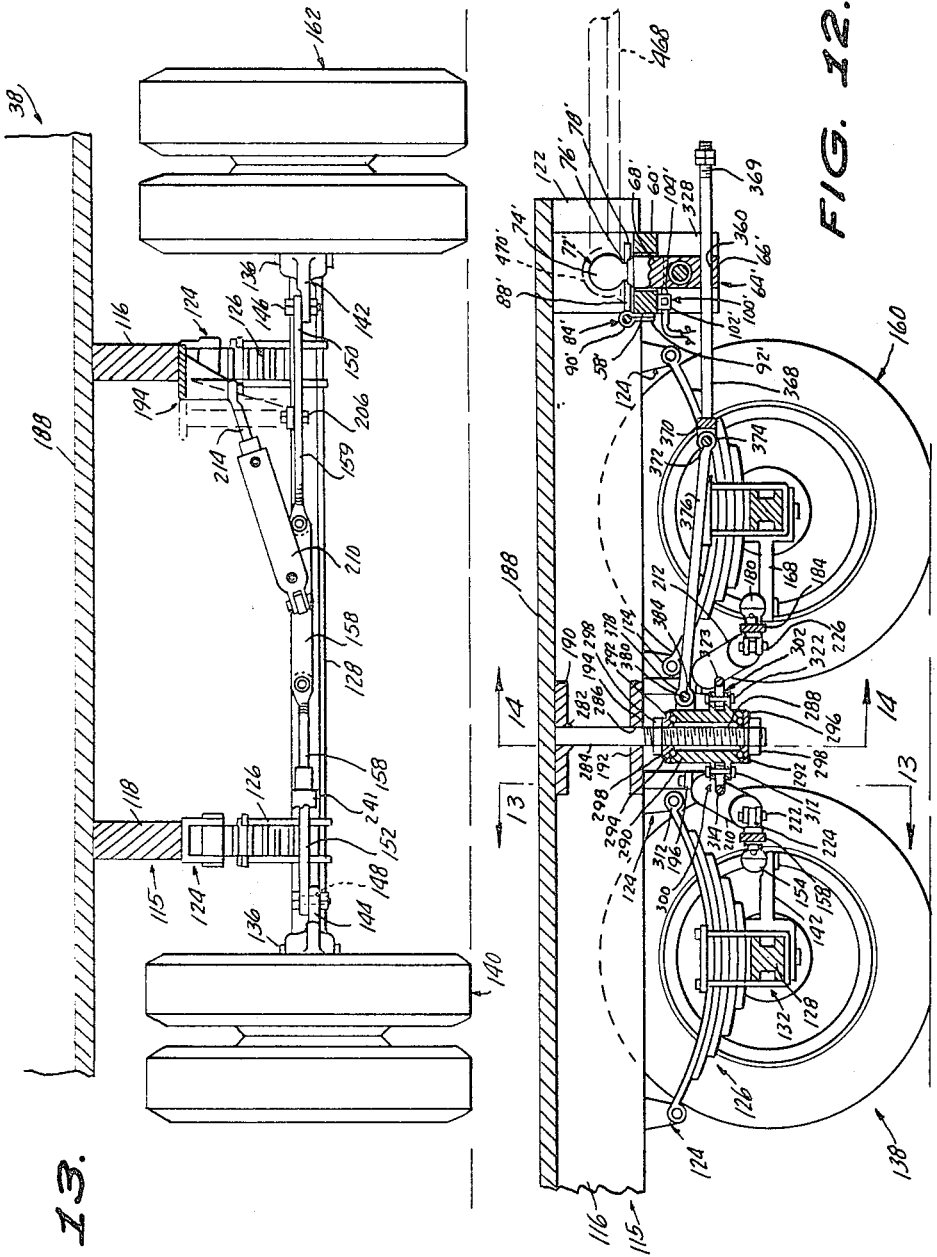

INVENTOR.
ANTHONY V. MANDEKIC,
BY
Berman, Davidson & Berman
ATTORNEYS.

United States Patent Office 3,389,762
Patented June 25, 1968

3,389,762
POWER-OPERATED MECHANICAL STEERING APPARATUS FOR TRAILERS AND SEMI-TRAILERS
Anthony V. Mandekic, 1549 Rendall Place, Los Angeles, Calif. 90026
Filed Aug. 19, 1966, Ser. No. 573,615
9 Claims. (Cl. 180—79.2)

ABSTRACT OF THE DISCLOSURE

Power steering means for a wheeled vehicle having a chassis, means connecting and supporting said chassis on said wheels disposed, respectively, on opposite sides of said chassis and means connected to each of said wheels to change the angularity thereof relative to said chassis to effect a steering of said vehicle, said connected means including axles mounting said wheels for rotation thereon and a steering lever for each axle, means mounted on said chassis for selective movement transversely thereof in either direction relative thereto, hydraulic power means connected with and extending between said steering levers and said chassis, valve means for each of said hydraulic power means, valve-control means operatively-connected with said selectively-movable means, said valve-control means controlling fluid flow to and from said hydraulic power means actuating said hydraulic power means to move said steering levers and consequently said wheel axles to effect steering of said vehicle in response to movement of said power steering means, and a source of fluid under pressure connected with said valve means, a cylindrical member mounted for rotation on said chassis, lever means having an end fixedly-secured on said cylindrical member and a second end connected to said selectively-movable means whereby movement of said selectively-movable means causes said cylindrical member to rotate in the direction of the movement, and a connection between said cylindrical member and said valve control means whereby to effect control of said valve-control means.

---

In my United States Patent No. 3,172,685, entitled, "Trailer Steering Mechanism," filed Dec. 14, 1962, and which issued on Mar. 9, 1965, I disclosed the provision of means for manually controlling mechanical steering mechanisms for trailers and semi-trailers. The means described, illustrated and claimed therein were driver-controlled without power assistance, and while the means of my patent constitutes a marked advance in its art, the disclosure of the instant invention constitutes an improvement thereover in the provision of power means for the control of certain mechanisms of the steering apparatus thereby conserving the driver's energy to reduce fatigue, especially over long hauls, while at the same time, assuring the driver of a more positive and accurate control over the involved steering system.

The steering system of the present invention, as was true in my preceding patent, has as a primary object thereof the provision of driver-operated steering means for changing the pivotal centers of the drawbars of semi-trailers and trailers to turn the wheels of single or double-axle semi-trailers and trailers connected singly or in tandem to a tractor. The turning movement to which reference has been made complementing the turns made by the operating tractor and to such a degree as deemed necessary by the tractor operator to cause the semi-trailer and/or trailer to follow the path of the tractor (without necessarily tracking the same) to avoid crowding or colliding with vehicles at either side of the road, highway or street, to prevent dangerous and damaging contact with or the climbing of curbs by the wheels of the semi-trailer or trailer, and to facilitate the backing and parking of the semi-trailer and/or trailer into spaces provided therefor.

Another object of this invention is to provide together with the power-operated means generally referred to supra, driver-operated means for locking the wheels of the semi-trailer and/or trailer in centered or straight forward positions and for locking the semi-trailer or trailer against movements out of positions corresponding to the centered positions of these wheels.

It is a further object of this invention to provide, in association with the means to which reference has been generally made supra, means operable to indicate if the trailer wheels are or are not centered.

This invention contemplates, as a still further object thereof, the provision of a power-operated steering mechanism or apparatus which is essentially non-complex in construction and assembly, relatively inexpensive to manufacture and maintain, and which is durable in use.

Other and further objects and advantages of the instant invention will become more evident from a consideration of the following specification when read in conjunction with the annexed drawings, in which:

FIGURE 1 is a longitudinally-contracted and fragmentary left-hand side elevational view showing a semi-trailer hitched to a tractor and a trailer hitched to the semi-trailer, and certain mechanical components of the instant invention which are associated therewith;

FIGURE 2 is a top plan view of FIGURE 1;

FIGURE 3 is a fragmentary schematic perspective view of the tractor's cab, this figure showing the tractor steering wheel, a driver-operated trailer wheel steering wheel and associated driver-operated means for locking the trailer wheel steering wheel and the trailer wheels in centered positions, parts being broken away and being in section for the purpose of clarity in illustration;

FIGURE 4 is a fragmentary sectional end rear elevational view of the tractor wheel steering wheel and the locking means, the latter being shown in full lines in its engaged position and in phantom lines in its disengaged and rotated position;

FIGURE 5 is an enlarged fragmentary detail cross-sectional view of the tractor wheel steering wheel assembly, FIGURE 5 being taken substantially on the vertical plane of line 5—5 of FIGURE 3, looking in the direction of the arrows;

FIGURE 6 is a detail cross-sectional view, FIGURE 6 being taken on the horizontal plane of line 6—6 of FIGURE 5, looking in the direction of the arrows;

Figure 14:
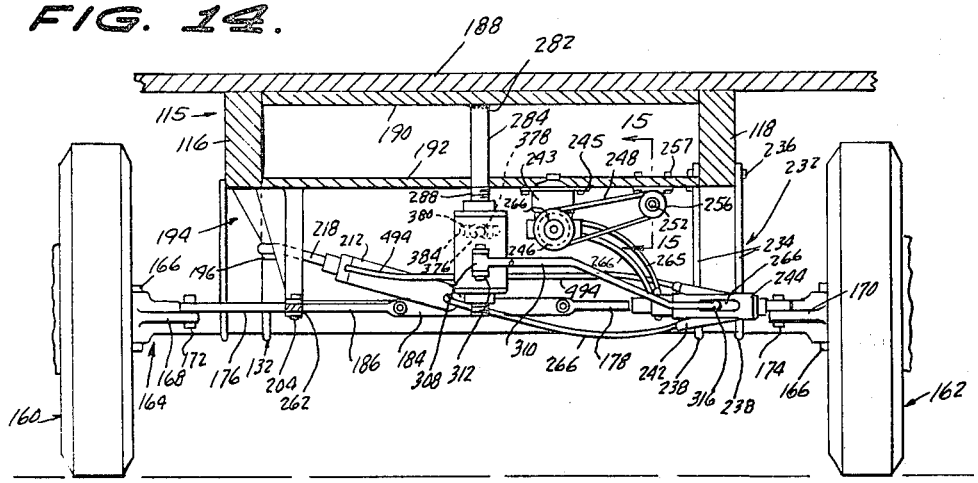
Figure 15:
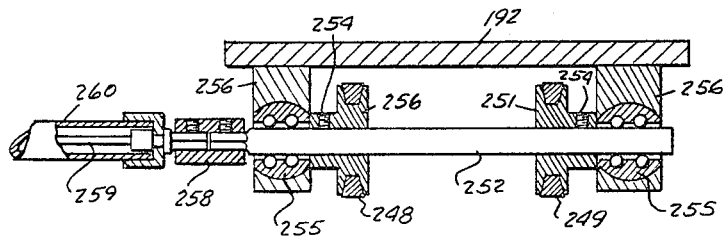
Figure 16:
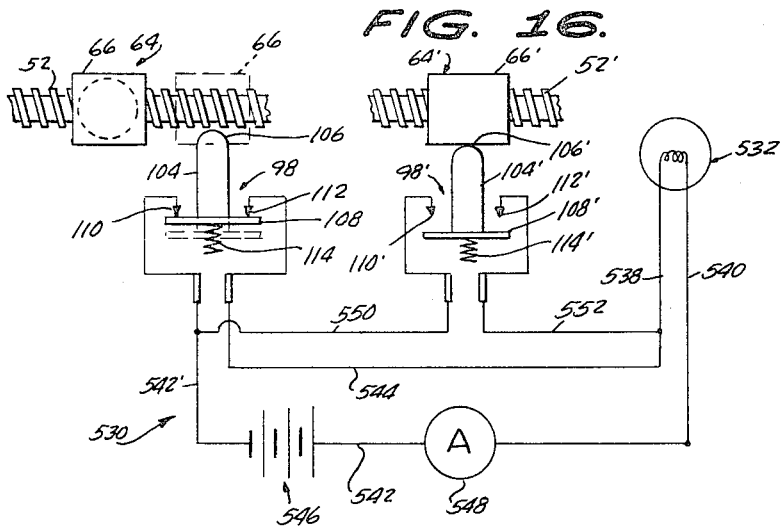

FIGURE 7 is a fragmentary top plan view of the tractor wheel steering assembly showing the traveler nut in centered position and in full lines, and showing the wheel assembly and traveler nut in phantom lines in an operated position, this figure also illustrating, in full lines, the locking means for locking the traveler nut in centered and locked position, and showing the locking means in dotted lines when moved to its unlocked position;

FIGURE 8 is a transverse detail cross-sectional view, FIGURE 8 being taken substantially on the horizontal plane of line 8—8 of FIGURE 7, looking in the direction of the arrows;

FIGURE 9 is a detail transverse cross-sectional view, FIGURE 9 being taken substantially on the vertical plane of line 9—9 of FIGURE 8, looking in the direction of the arrows;

FIGURE 10 is a fragmentary bottom plan view taken substantially on the horizontal plane of line 10—10 of FIGURE 9, looking in the direction of the arrows;

FIGURE 11 is a fragmentary bottom plan view taken substantially on the horizontal plane of line 11—11 of FIGURE 1, looking in the direction of the arrows;

FIGURE 12 is a fragmentary vertical transverse cross-sectional view, FIGURE 12 being taken substantially on the line 12—12 of FIGURE 11, looking in the direction of the arrows and showing the locking means of the steering assembly and certain components of the power steering mechanisms;

FIGURE 13 is a detail transverse cross-sectional view, partly in elevation, FIGURE 13 being taken substantially on the vertical plane of line 13—13 of FIGURE 12, looking in the direction of the arrows;

FIGURE 14 is a detail cross-sectional view, partly in elevation, FIGURE 14 being taken substantially on the vertical plane of line 14—14 of FIGURE 12, looking in the direction of the arrows;

FIGURE 15 is an enlarged detail fragmentary cross-sectional view, FIGURE 15 being taken substantially on the vertical plane of line 15—15 of FIGURE 14, looking in the direction of the arrows; and FIGURE 16 is a fragmentary schematic wiring diagram showing the details of switching apparatus for signal lights.

Referring now more specifically to the drawings, reference numeral 20 designates, in general, a conventional tractor having the usual tractor chassis frame 22 which includes, as component members thereof, the tractor chassis side frame members 24, 26 to the adjacent pair of rear ends to which is fixedly-connected a tractor chassis end frame member 28. The tractor chassis frame 22 is supported from the usual tractor front steering wheels 30 at the opposed sides thereof and similarly disposed tractor dual rear wheels 32. A conventional tractor cab is indicated at 34 and, as is seen in FIGURES 1 and 2, the cab is positioned on the tractor chassis frame 22 intermediate the ends of its side frame members 24, 26, leaving end portions of the latter extending behind the cab 34 free and unobstructed.

Referring now more specifically to FIGURES 1, 2, 7 and 8, reference numeral 36 denotes trailer steering control and detachable connecting means for a wheeled trailer indicated in general by reference numeral 38. As is seen in FIGURES 1 and 2, these control and connecting means are disposed on the unobstructed ends of the tractor chassis side frame members 24, 26 and comprise a pair of identically-constructed substantially L-shaped brackets 40, 42 (see FIGURES 7 and 8) having a foot portion 44, 46, respectively, fixedly-connected by conventional means (not shown) to an immediately adjacent one of the tractor chassis side frame members 24, 26. Each of the L-shaped brackets 40, 42 has perpendicularly and upwardly-projecting therefrom a leg portion 48, 50, respectively, the leg portions 48, 50 being disposed in laterally-spaced, parallel and confronting relationship relative to one another. An elongated threaded screw 52 extends between the leg portions 48, 50 and has its ends journaled for rotation and against endwise movement in aligned openings 53, 54 which extend transversely through the leg portions 48, 50 intermediate their respective upper and lower ends. As is seen on FIGURES 7 and 8, one end of the screw 52 terminates in a wrench head 55, and the other end thereof terminates in a centrally-apertured eye 56. Extending between and fixedly-secured to the upper ends of the leg portions 48, 50 are a pair of elongated substantially rectangular guide bars 58, 60, the guide bars 58, 60 being laterally-spaced and substantially parallel with respect to one another and defining therebetween an elongated substantially rectangular guide slot 62. As is seen in FIGURE 7, the screw 52 is disposed below the guide bars 58, 60 and is centered therebetween.

At 64 (see FIGURES 7 and 8) is designated an inverted substantially T-shaped traveling block having an internally-threaded crosshead 66 which threadedly-receives the screw 52. Projecting upwardly and centrally from the crosshead 66 is a stem 68 having a downwardly-extending centrally-located and internally-threaded socket 70 formed therein. As is seen in the several figures of the drawings, the stem 68 projects upwardly between the guide bars 58, 60 for guided longitudinal movement relative to the slot 62, the guide bars 58, 60 serving, in addition to means for defining the slot 62, as means for preventing the rotation of the stem 68 as the screw 52 is turned about its longitudinal axis.

Reference numeral 72 denotes, in general, the male connector element of the steering control and detachable connecting means 36, the male connector element 72 comprising a substantially spherical head 74 having a downwardly-projecting cylindrical neck 76 at its lowermost apex, the neck 76 being fixedly-secured at its lower end to an enlarged substantially cylindrical flange 78. The spherical head 74, the cylindrical neck 76 and the cylindrical flange 78 are connected together and to the stem 68 by means of a bolt 80 which (see FIGURE 8) is adapted to be threadedly-received within the socket 70 with diametrically-opposed portions of the flange 78 spanning and slidably-engaging adjacent portions of the upper sides of the guide bars 58, 60.

Traveling block centering means is provided for holding the traveling block 64 in centered position intermediate the ends of the screw 52. These means include a substantially U-shaped member 82 having a central bight portion 84 from the opposed ends of which laterally-project a pair of spaced parallel and confronting arms 86, 88. The bight portion 84 is rotatably journaled in a barrel 90 (see FIGURES 7 and 9) disposed above the common plane of the upper sides of the guide bars 58, 60, the barrel 90 being integral with depending flange means 92 fixedly-secured to the guide bar 60 by means well-known in this art. As is clearly seen in FIGURES 7, 8 and 10, the bight portion 84 at one of its respective ends is extended beyond its adjacent arm 86 to form a neb 94 to which is rigidly-connected an annular member 96.

Referring now more specifically to FIGURES 7, 9 and 10, 16, reference numeral 98 designates, in general, a conventional normally open electric switch which includes a housing 100 fixedly-secured to the underside of the guide bar 60 by means of a depending substantially U-shaped bracket 102. The switch 98 includes an elongated substantially cylindrical button 104 having an ogive-shaped outer end 106, to which further reference will be made, the button 104 being reciprocable within the housing 100 and carrying at its inner end a transversely-extending movable switch arm 108 which is adapted to close against and open away from the fixed switch contacts 110, 112 (FIGURE 16). The switch 98 being of conventional construction, it will be understood that the switch arm 108 and its cooperating fixed switch contacts 110, 112 are disposed within the housing 100, and also positioned within the housing 100 is a helicoidal spring 114 which constantly biases the switch arm 108 for movement toward its closed position. As is seen in FIGURE 16, the ogive end 106 is disposed in the path of movement of the crosshead 66 so that when the crosshead 66 is moved from its full-line position shown in the last-mentioned figure to its dotted-line position, the switch arm 108 will move from its full-line position to its dotted-line position, thereby breaking its contact with the fixed switch contacts 110, 112 and interrupting a circuit to be described. The switch 98 is centered between the arms 86, 88 so that when the traveling block 64 is in its centered position, the circuit including the switch 98 is de-energized, but when the traveling block 64 moves to ether side of its centered position, the circuit becomes de-energized.

Referring now more specifically to FIGURES 1, 2 and 11 to 14, inclusive, reference numeral 115 denotes an elongated substantially open trailer chassis frame for the trailer 38 and which includes a pair of elongated laterally-spaced and substantially parallel trailer chassis side frame members 116, 118 having their respective adjacent pairs of ends rigidly-connected together by trailer chassis front and rear end frame members 120, 122, respectively. Depending from the underside of each of the trailer chassis side frame members 116, 118 are a plurality of conventional connector means 124 to which is connected the usual spring suspension devices 126. Extending transversely across the trailer chassis side frame members 116, 118, in the conventional manner, is a pair of fixed axles 128, 130 positioned adjacent to, but spaced longitudinally from the trailer chassis end frame member 122. For the purpose of convenience, the axle 128 will be hereinafter referred to as the "front axle" and the axle 130 will be referred to as the "rear axle."

Conventional shackle means 132 serve to connect the front and rear trailer axles 128, 130 to their immediately adjacent spring suspension devices 126, all in the conventional manner. The front axle 128 has its opposed ends provided with conventional steering knuckles 134 each of which is pivotally-connected thereto by a kingpin 136. The steering knuckles 134 are each provided with the usual stub axle (not shown) on which is mounted the dual pairs of front steering wheels 138, 140, the pairs of steering wheels 138, 140 being disposed, respectively, on opposite sides of the trailer chassis frame 115.

The steering knuckles 134 each includes the usual and customary steering levers 142, 144, respectively, which converge inwardly and rearwardly relative to the trailer chassis frame 115. The outer end of each of the steering levers 142, 144 is pivotally-connected at 146, 148, respectively, to one of the ends of a pair of front drawbars 150, 152. Ball-and-socket connectors 154, 156 pivotally-connect the other or adjacent ends of the drawbars 150, 152 to the opposed ends of a compound lever 158, the latter having a longitudinally-extending rearwardly-offset portion 159 to which further reference will be made.

The rear axle 130 is provided with dual pairs of rear steering wheels 160, 162, these last-mentioned steering wheels being arranged in tandem with respect to the front pairs of dual steering wheels 138, 140. The rear steering wheels 160, 162 are connected with the rear axle 130 by conventional stub axles (not shown), and steering knuckles 164 are pivotally-connected adjacent an end of the rear axle 130 by means of kingpins 166. The steering knuckles 164 have as an integral part thereof, the inwardly and forwardly-converging steering levers 168, 170 and to the outer ends of the latter are pivotally-connected, as at 172, 174, drawbars 176, 178. Ball-and-socket connectors 180, 182 connect the other ends of the drawbars 176, 178 with the opposed ends respectively, of an elongated compound lever 184 having an elongated longitudinally-extending forwardly-offset portion 186 extending from an end thereof in the same direction as the offset portion 159, and to which further reference will be made.

Substantially centrally-located between the front and rear axles 128, 130, respectively, and fixedly-secured to a trailer bed 188 at the underside thereof is an elongated substantially rectangular upper cross-plate 190 (see FIGURE 14), the cross-plate 190 extending between the longitudinal trailer chassis side frame members 116, 118. Extending between the trailer chassis side frame members 116, 118 and fixedly-secured thereto by conventional means is a lower elongated substantially rectangular cross-plate 192 (see FIGURES 12 and 15) disposed in vertically-spaced relation and below the upper cross-plate 190. To the underside of the trailer chassis side frame member 116 and to the adjacent underside of the lower cross-plate 192 is fixedly-secured a depending hanger bracket 194 having inwardly-turned normally horizontally-extending lips 196, 198 (see FIGURE 11) adjacent, respectively, at each of its opposed ends. Disposed between the lips 196, 198 and located therebelow is an inwardly-turned normally horizontal central lip 200. An elongated substantially rectangular link 202 (see FIGURE 11) is pivotally-connected at 204 centrally of its ends to the centrally-located lip 200, and the opposed ends of the link 202 are pivotally-connected at 206, 208 to the outer ends of the offset portions 159, 186 of the compound levers 158, 184, respectively.

Reference numerals 210, 212 denote front and rear hydraulic cylinders, respectively, the hydraulic cylinder 210 being provided with the reciprocating piston rod 214 having its outer end pivotally-connected at 216 to the lip 196. The reciprocating piston rod 218 is pivotally-connected at 220 to the lip 198. The hydraulic cylinder 210 is pivotally-connected at 222 to one end of a fitting 224, the latter being fixedly-connected to the compound lever 158 intermediate the ends thereof. Similarly, the hydraulic cylinder 212 is pivotally-connected at 226 to one end of a fitting 228 having its other end fixedly-secured to the compound lever 184 intermediate its opposed ends.

Reference numerals 230, 232 designate front and rear pairs of L-shaped angle brackets, the brackets 230 being disposed forwardly of the cross-plates 190, 192 and the L-shaped angle brackets 232 being positioned rearwardly thereof. The upper ends of the angle brackets 230, 232 include leg portions 234 (see FIGURE 11) fixedly-secured by conventional means 236 to the opposed sides of the longitudinally-extending trailer chassis side frame member 118, and the lower ends thereof terminate in foot portions 238 fixedly-connected at 240 (see FIGURE 11) to identical front and rear hydraulic valves 241, 242 of a hydraulic power steering system.

Referring now to FIGURE 11, reference numerals 243, 244 denote a pair of identical front and rear hydraulic pumps connected by conventional connector 245 (see FIGURE 14) to the underside of the cross-plate 192 and which depend therefrom. Each pump is provided with a drive pulley 246, 247, respectively, the drive pulleys being driven through endless pulley belts 248, 249 trained thereabout and around pulleys 250, 251, respectively, mounted on a shaft 252 (see FIGURE 15) and secured thereto for rotation therewith as by set screws 254. The opposed ends of the shaft 252 are rotatably-supported in conventional bearings 255 carried in journal boxes 256 secured at 257 (see FIGURE 14) to the underside of the cross-plate 192. One end of the shaft 252 (see FIGURE 15) is connected via a releasable coupler 258 to one end of a Bowen cable 259 sheathed at 260 and terminating at its other end in an annular member 261 (see FIGURE 11).

The high and low sides of the pumps 243, 244 (see FIGURE 11) connect through conduits 262, 263 and 264, 265, respectively, with the fluid inlet and outlet ports (not shown) of the valves 241, 242, respectively, and slidable handle-control means 266, 267 for these valves is also provided.

Fixedly-connected at 282 to the cross-plate 188 substantially centrally thereof is one end of a vertically-elongated shaft 284, the other end of the shaft depending therefrom for extension through a centrally-located opening 286 formed in the lower cross-plate 192, the extended lower end of the shaft 284 being externally-threaded as at 288 (see FIGURE 12). The lower threaded end 288 of the shaft 284 is circumscribed in spaced relation by a vertically-elongated hollow cylindrical barrel 290, the opposed ends of the latter journaling anti-friction roller bearings 292 riding on the outer upper and lower washer-type races 294, 296. Vertical or axial shifting of the barrel 290 is prevented by lock nuts 298 which are threaded on the threaded end 288 of the shaft 284 and which bear against the races 294, 296.

Two clevis-type brackets 300 and 302, respectively, project laterally from diametrically-opposed sides of the barrel 290 adjacent the lower end thereof. The outer end of a foot portion 308 of an L-shaped lever 310 (see FIGURE 11) is pivotally-connected in the brackets 300 on a clevis pin 312 (see FIGURES 11 and 12) having an elongated vertical axis, and the outer end of the leg portion 314 of the lever 310 is connected via a ball-and-socket connection 316 to the outer end of the valve actuating or control handle 266. In a similar manner, the outer end of a foot portion 318 of a second L-shaped lever 320 is pivotally-connected in the bracket 302 on a clevis pin 322 (see FIGURES 11 and 12) having an elongated vertical axis, and the outer end of the leg portion 323 of the L-shaped lever 320 is connected by ball-and-socket means 324 to the valve actuating or control handle 262.

Spaced inwardly from, but adjacent to the end trailer chassis frame member 122 is a semi-trailer steering and control apparatus 36' (see FIGURE 11) similar in construction and assembly with respect to the assembly 36. The assembly 36' serves to steer and to connect a conventional wheeled semi-trailer 326 with the trailer 38 and, to distinguish the component elements of the assembly 36 from that of the assembly 36', the elements of the latter assembly finding counterparts in the former assembly are assigned identical reference numerals to which a prime mark has been added.

The steering assembly 36' differs the assembly 36 in the provision of a pair of vertically-elongated laterally-spaced and confronting substantially rectangular plates 328, 330 having their respective upper ends fixedly-connected to the chassis side frame members 116, 118, respectively, with their opposed ends depending therebelow. As before, an elongated threaded screw 52' extends between the plates 328, 330 and has its ends journaled for rotation in suitable openings (not shown) which extend transversely through the plates 328, 330 adjacent the lower ends thereof. One end of the screw 52' terminates in a wrench head 55', while the other end thereof terminates in a centrally-apertured eye 56'. The wrench head 55' is shown in FIGURE 11 as having detachably-connected thereto a conventional manually-operable crank 332. It will be understood, of course, that the same crank may be detachably-connected with the wrench head 55 of the screw 52 to effect adjustment of the latter.

Extending between and fixedly-secured to the plates 328, 330 are a pair of elongated substantially rectangular guide bars 58', 60', the guide bars 58', 60' being laterally-spaced and substantially parallel with respect to one another and defining therebetween an elongated substantially rectangular guide slot 62'. As is seen in FIGURE 12, the screw 52' is disposed below the guide bars 58', 60' and is centered therebetween.

At 64' is designated an inverted substantially T-shaped traveling block having an internally-threaded crosshead 66' which threadedly-receives the screw 52'. Projecting upwardly and centrally from the crosshead 66' is a stem 68' having a downwardly-extending centrally-located and internally-threaded socket, as before, the stem 68' projecting upwardly between the guide bars 58', 60' for longitudinal movement relative to the slot 62', and as has been stated above, the guide bars 58', 60' serve, in addition to means for defining the slots 62', as means for preventing the rotation of the stem 68' as the screw 52' is turned about its longitudinal axis.

Reference numeral 72' denotes, in general, the male connector element of the steering control and detachable connecting means 36', the male connector element 72' comprising a substantially spherical head 74' having a downwardly-projecting cylindrical neck 76' at its lowermost apex, the neck 76' being fixedly-secured at its lower end to an enlarged cylindrical flange 78'. As before, an externally-threaded screw (not shown) threadedly-connects the male connector element with the stem 68' of a traveling block 64'.

The same type of traveling block centering means described above is provided for the traveling block 64'. These means include a substantially U-shaped member having a central bight portion 84' from the opposed ends of which laterally-project a pair of spaced, parallel and confronting arms 86', 88' (see FIGURES 11 and 12). The bight portion 84' is rotatably-journaled in a barrel 90' disposed above the common plane of the upper sides of the guide bars 58', 60', the barrel 90' being integral with depending flange means 92' fixedly-secured to the guide bar 58' by means well-known in this art. The bight portion 84' at one of its respective ends is extended beyond its adjacent arm 86' to form a neb 94' to which is connected an annular member 96'.

The assembly 36' includes, as before, a normally open electric switch which includes a housing 100' fixedly-secured to the guide bar 58' by means of a substantially U-shaped depending bracket 102'. The switch comprises an elongated cylindrical button or rod 104' having an ogive-shaped outer end 106' (see FIGURE 16), the button or rod 104' being reciprocable within the housing 100' and carries at its inner end a transversely-extending switch arm 108' which is adapted to close against and open away from the fixed switch contacts 110', 112'. The switch 98' being of conventional construction, it will be understood that the switch arm 108' and its cooperating fixed switch contacts 110', 112' are disposed within the housing 100' which also encompasses the helicoidal spring 114' that constantly biases the switch arm 108' for movement toward its closed position. As is seen in FIGURE 16, the ogive end 106' is engaged by the crosshead 66' so that the switch 98' is in its open position when the traveling block 66' is centered relative to its associated screw 52'.

The traveling nut 64' differs from its counterpart 64 in the provision of an opening 360 which extends transversely therethrough in a direction perpendicular to the longitudinal axis of the screw 52' (see FIGURE 12). The sidewalls of the opening 360 are convex as indicated at 362, 364, and confront one another.

Reference numeral 366 designates, in general, a two-piece steering lever which includes a first elongated steering bar 368 having a central portion thereof slidably-mounted in the opening 360 and having a rear end normally projecting beyond (see FIGURE 11) the rear chassis frame member 122. This end of the bar 368 is threaded at 369 to receive stop nuts 369A thereon. The other end of the first steering bar 368 terminates in a clevis head 370 to which is pivotally-connected a cylinder head 372, the connection therebetween being accomplished by a clevis pin 374 having a horizontal axis. To the cylinder head 372 is connected one end of an elongated second steering bar 376, the other end of the latter terminating in a second cylinder head 378 connected in a clevis-type bracket 380 (see FIGURES 11 and 12), by means of a clevis pin 382 having a horizontal axis.

A trailer wheel manually-operable assembly 368 is positioned within the cab 34 and comprises an upright steering column 388 fixedly-mounted on the floor 390 within the cab 34, on a level below the tractor steering wheel 392, but adjacent thereto. One end of a Bowen cable 394 and its sheath 396 (see FIGURE 5) extends upwardly into the steering column 388. The upper end of the sheath 396 has a ferrule 398 thereon which is inserted upwardly into a cap 400 fitting the bore of the steering column 388 and suitably-secured to a sleeve 402 which is threaded on the upper end of the steering column 388 as indicated at 404. The sleeve 402 carries an external annular bearing 406 which suitably journals the cylindrical sidewall 408 of a dome-shaped hub 410 to the sleeve 402. A cross-pin 412 extends diametricaly across the sidewall 408 and extends transversely through a cylindrical connector 414 having a depending reduced neck 416. The reduced neck 416 extends transversely through an opening 418 formed in a closure plate 420 of the cap 400. The lower end of the connector 414 is enlarged as at 422 to telescopically fit within the ferrule 398 in which it is fixedly-secured. Spokes 424 radiate from the hub 410 and have a steering wheel 426 fixedly-secured to the outer ends thereof. The other end of the Bowen cable 394 terminates in a snap hook 428 (see FIGURE 8) detachably-engageable with the annular member 56. Thus, rotation of the steering wheel 426 will cause the traveling block 66 to move from its centered position shown in FIGURES 2 and 7.

A second Bowen cable 430 and its sheath 432 have their respective upper ends extending parallel to the column 388, and the sheath 432 terminates in an enlarged collar 434 which, in turn, receives the lower end of an elbow member 436, the latter being secured to the column 388 by conventional clamp band means 438. The other end of the elbow member 436 is closed by a cap 440 having a closure wall 442 provided with a transverse opening 444.

To the upper terminal end of the cable 430 is affixed an enlarged head 446 having an outer reduced neck 448 rotatably-received within the opening. The outer end of the neck 448 carries a stop flange 450 which abuts the closure wall 442 and to which is fixedly-connected an annular member 452. A loop 454 at one end of a lever 456 is loosely interlinked with the annular member 452, and to the other end of the lever 456 is connected clamp means 458 adapted for releasably-engaging the steering wheel 426, the clamp means being spring-biased to its closed position.

The other end of the Bowen cable 430 (see FIGURE 8) terminates in an anular member 460 which is loosely engaged by the anular member 462 at one end of an eye link 464, the other end of the link 464 having a releasable snap hook 466 connected thereto releasably-connected with the annular member 96.

Release of the clamp means 458 from the steering wheel 426 frees the lever 456 for rotation to and through its dotted-line position shown in FIGURE 4, whereby the Bowen cable 430 may be rotated in one direction to raise the arms 86, 88 of the U-shaped lock member 82 to its dotted-line position shown in FIGURE 8 to free the traveling block 64 for adjustment as described above, and thereafter rotated in the reverse direction restoring it to its full-line position as shown in FIGURES 7 and 8 to hold the traveling block 64 against axial movement relative to the axis of screw 52.

Reference numeral 468 denotes a drawbar for the trailer 38. One end of the drawbar 468 terminates in a hollow socket 470 at one of its ends and which comprises the female element of the detachable connecting means for the tractor 20 and trailer 38, the socket cooperating with the spherical head 74 of the male connector element 72. The other end of the drawbar 468 is connected to a suitable portion of the trailer chassis frame 115, the front frame member 120, for example.

At 472 is indicated a power take-off shaft (see FIGURE 2) connected with the crankshaft (not shown) of the tractor motor 474. An endless belt 476 is trained about a pulley 478 secured on and driven by the shaft 472 and around a pulley 480 suitably supported by a journal 482 supported on the chassis 22 and connected to one end of a Bowen cable 484 (see FIGURE 11) encased in its sheath 486 (see FIGURES 2 and 11). The other end of the cable 484 terminates in an annular member 488 which is loosely and releasably-engaged in the annular member 261 of the Bowen cable 259. The pumps 243, 244 are, thus, constantly driven as the motor 474 is activated.

Thus, with the motor 474 running and when it is desired to steer the trailer 38, a small amount of power applied to the screw 52 through the lever 456 causing the chassis frame 115 of the trailer 38 to turn in either direction away from its normal in-line relationship relative to the tractor 20 will cause one or the other of the sidewalls 362, 364 of the traveling block 64 to engage the first steering bar 368 and to push the same thereby causing the barrel 290 to rotate in the same direction. This causes the leg portions 314, 323 to move in opposite directions relative to one another and to move their associated valve handles 266, 267 to move in the same directions. As the handles 266, 267 move they control the direction of the hydraulic fluid flow, in one instance, through the conduits 490, 492 of the valve 241 to which one of their respective ends are connected, their other ends being connected to the opposite ends of the hydraulic cylinder 210, and of course, in the other instance, the direction of the flow of hydraulic fluid through the conduits 494, 496 connected between the valve 242 and the hydraulic cylinder 212.

With the hydraulic cylinders 210, 212 actuated the piston rods 214, 218 are operated in reverse directions, thereby exerting forces on the compound levers 158, 184 causing the latter to shift in directions reverse from one another whereby the wheels 138, 140 and 160, 162 are, respectively, turned in contra-rotation relative to one another to effect steering of the trailer 32.

This same steering or adjustment of the steering wheels 138, 140 and 160, 162 may be obtained by disconnecting the Bowen cables 394, 430 and releasably-connecting a crank 332 to the wrench head 55 to rotate the screw 52 after, of course, the U-shaped member 82 has been rendered inoperative, and the same adjustments can be obtained by releasing the clamp means 458 from the steering wheel 426.

Steering of the semi-trailer 326 is obtained by coupling the hollow socket 470 of the semi-trailer drawbar 468' to the spherical head 74' of a male connector element 72' all constructed and assembled as described above. The socket 470' is disposed at one end of a drawbar 468', the other end thereof being fixedly-connected to the front frame member 498 of the semi-trailer chassis 500. This chassis includes the rear frame member 502 and the elongated substantially parallel side frame members 504, 506, and to the latter is connected the conventional spring suspension devices 126' to which is shackled a transversely-extending fixed axle 508 which carry the dual wheels 510, 512, respectively, disposed at opposite sides of the chassis frame 500.

In the condition of the apparatus shown in FIGURES 1, 2, and 11, the U-shaped member 82 may be manually-raised from its full-line position shown in FIGURES 7, 8 and 9 to its dotted-line position of FIGURE 8 after which the crank 332 may be operated to shift the position of the drawbar 498, as described above, and thereby substantially simultaneously shift the steering lever 366 in one direction or the other to effect the turning of the steering wheels 138, 140 and 160, 162, respectively, as described above, or optionally, the apparatus may be operated from the steering wheel 426 and the lever 456.

If the latter means are to be employed, the snap fasteners or connectors 428, 466 are disconnected from the annular members 56, 96 (see FIGURES 7 and 8), respectively, and are connected, as shown in dotted lines in FIGURE 2, to one of the ends of a pair of links 514, 516, respectively, the links 514, 516 terminating at their other respective ends in annular members 518, 520 (see FIGURE 11) which are, in turn, connected to annular members 522, 524 fixedly-connected to one of the ends of Bowen cables 394', 430', respectively. The links 514, 516, when not in use, may be suitably supported by conventional bracket means (not shown) in their respective inoperative positions of FIGURES 1 and 2.

The Bowen cables 394', 430' are enclosed in their respective sheaths 396', 432', and their other ends terminate in annular members which are engaged in the annular members 94', 56'.

With these connections, the tractor driver effects control of the U-shaped member 82' to release the traveling block 64' for movement relative to its screw 52' thereby shifting the position of the drawbar 468' and changing the steering position of the wheels 138, 140 and 160, 162, respectively, all as described above.

This invention contemplates the provision of indicating means to indicate to the driver the positions of the traveling blocks 64, 64'. To this end, the switches 98, 98' control an electrical circuit 530 (see FIGURE 16) which includes an indicator light 532. The light 532 is suitably-mounted on the steering column 388 by socket means 534 of conventional construction. A cable 536 extends through the steering column 388 and includes wires 538, 540 connected at one of their ends with the socket 534, and at their other ends through wires 542, 542' and 544 with the fixed switch contacts 110, 112, respectively. Interposed in the wire 542, 542' and connected in series therewith is a power source, such as the tractor battery 546, and an ammeter 548.

In the full-line position of the traveling block 66 shown in FIGURE 16 the block 66 is moved off-center relative to its associated screw 52 whereby the switch arm 108 closes across the fixed switch contacts 110, 112 to close the series circuit to the light 532 which also gives a reading on the ammeter 548 which may be dashboard-mounted or otherwise placed for easy observation by the tractor operator.

The circuit 530 also includes wiring connecting the switch 98' in parallel with the switch 98. To effect this circuit, a wire 550 has one of its ends connected to the wire 542' and its other end connected to the fixed switch contact 110'. Another wire 552 has one of its ends connected to the wire 538 and its other end connected to the fixed switch contact 112'.

In the position of the block 64' shown in FIGURE 16 the same is centered relative to its screw 52', thus holding the switch 108' open. But should the block 64' move to an off-center position, such as the position of the block 66, the switch arm 108' closes against the fixed switch contacts 110', 112' to close the circuit to the light 532.

Thus, in the off-center positions of either or both of the blocks 66, 66', the light 532 will be energized to indicate an off-center position of these blocks.

Having described and illustrated one embodiment of this invention in detail, it will be understood that the same is offered merely by way of example, and that this invention is to be limited only by the scope of the appended claims.

What is claimed is:

1. Power steering means for a wheeled vehicle having a chassis, means connecting and supporting said chassis on said wheels disposed, respectively, on opposite sides of said chassis, and means connected to each of said wheels to change the angularity thereof relative to said chassis to effect a steering of said vehicle, said connected means including axles mounting said wheels for rotation thereon and a steering lever for each axle, means mounted on said chassis for selective movement transversely thereof in either direction relative thereto, hydraulic power means connected with and extending between said steering levers and said chassis, valve means for each of said hydraulic power means, valve-control means operatively-connected with said selectively-movable means, said valve-control means controlling fluid flow to and from said hydraulic power means actuating said hydraulic power means to move said steering levers and consequently said wheel axles to effect steering of said vehicle in response to movement of said power steering means, and a source of fluid under pressure connected with said valve means, a cylindrical member mounted for rotation on said chassis, lever means having an end fixedly-secured on said cylindrical member and a second end connected to said selectively-movable means whereby movement of said selectively-movable means causes said cylindrical member to rotate in the direction of the movement, and a connection between said cylindrical member and said valve control means whereby to effect control of said valve-control means.

2. Power steering means of the type described in claim 1 wherein said selectively-movable means includes a block threaded for movement axially of a screw extending transversely of said chassis and having opposed ends journaled for rotation thereon.

3. Power steering means as defined in claim 2 wherein said valve-control means includes a valve-control handle for each one of said valve-control means, and lever means connecting each valve-control handle with said cylindrical member and movable therewith to shift the position of said valve-control handle means in accordance with the movement of said selectively-movable means.

4. Power steering means as defined in claim 3 wherein said wheeled vehicle chassis includes a wheel disposed on each side thereof and said hydraulic power means includes a hydraulic cylinder.

5. Power steering means as defined in claim 3 wherein said wheeled vehicle includes two pair of oppositely-disposed wheels with the wheels of each pair being disposed, respectively, on opposite sides of said chassis and with the wheels at each side thereof being arranged in tandem, lever means connecting said steering levers of each pair of opposed wheels, and hydraulic power means connected between said lever means and said chassis to effect the turning of each opposed connected pair of wheels in contra-directions relative to one another substantially simultaneously and in equal increments.

6. Power steering means for a wheeled vehicle as defined in claim 5 wherein said chassis includes a pair of opposed longitudinally-extending side frame members, and said hydraulic power means is connected with one of said side frame members.

7. Power steering means for a wheeled vehicle as defined in claim 6, and means connected with said screw to effect rotation thereof.

8. Power steering means for a wheeled vehicle as defined in claim 7, and means including remotely-actuated means to releasably-lock said selectively-movable means in a predetermined position on its said screw.

9. Power steering means for a wheeled vehicle as defined in claim 8, and means connected with said selectively-movable means to indicate the position of said selectively-movable means other than said predetermined position relative to its said screw.

References Cited

UNITED STATES PATENTS

| 2,646,850 | 7/1953 | Brown | 180—79.2 |
|---|---|---|---|
| 3,172,685 | 3/1965 | Mandekic. | |
| 3,178,203 | 4/1965 | Elliot | 280—470 |
| 3,202,238 | 8/1965 | Strader | 180—79.2 |
| 3,212,793 | 10/1965 | Pietroroia. | |

BENJAMIN HERSH, *Primary Examiner.*

J. A. PEKAR, *Assistant Examiner.*